United States Patent [19]

Matsumoto et al.

[11] 4,134,263
[45] Jan. 16, 1979

[54] AIR CLEANER FOR USE IN AN INTERNAL COMBUSTION ENGINE

[75] Inventors: Noboru Matsumoto; Mikio Nakashima; Humihiro Kokubo; Yukio Nakamura; Yoshiaki Adachi, all of Toyota, Japan

[73] Assignee: Toyota Jidosha Kogyo Kabushiki Kaisha, Toyota, Japan

[21] Appl. No.: 802,052

[22] Filed: May 31, 1977

[30] Foreign Application Priority Data

Mar. 25, 1977 [JP] Japan ................................ 52-32161

[51] Int. Cl.$^2$ ............................................. F01N 3/10
[52] U.S. Cl. ...................................... 60/293; 55/344; 55/484; 55/DIG. 28
[58] Field of Search ................. 60/293, 307, 304, 305; 55/344, 484, DIG. 28

[56] References Cited

U.S. PATENT DOCUMENTS

| 3,347,217 | 10/1967 | Giorgio | 123/122 D |
| 3,545,201 | 12/1970 | Pedersen | 123/122 D |
| 3,906,724 | 9/1975 | Yoshizaki | 60/307 |
| 4,083,184 | 4/1978 | Ushijima | 60/293 |

Primary Examiner—Douglas Hart
Attorney, Agent, or Firm—Stevens, Davis, Miller & Mosher

[57] ABSTRACT

Disclosed is an air cleaner for use in an internal combustion engine. The air cleaner has an air filter element and a secondary air filter element therein. Secondary air is fed into the exhaust system of the engine from the air cleaner via the secondary air filter element and a reed valve for promoting the oxidation of unburned HC and CO components in the exhaust gas. A partition is disposed on the circumferential wall of the casing of the air cleaner and is arranged so as to extend along approximately half of the circumferential wall. A secondary air passage is formed between the partition and the circumferential wall. The secondary air filter element and the secondary air inlet are disposed in one end of the secondary air passage. The other end of the secondary air passage opens into the atmosphere. A plurality of holes are formed on the partition and are equiangularly arranged along the circumferential wall.

10 Claims, 10 Drawing Figures

AIR CLEANER FOR USE IN AN INTERNAL COMBUSTION ENGINE

DESCRIPTION OF THE INVENTION

The present invention relates to an air cleaner of an internal combustion engine.

There has been known an internal combustion engine in which secondary air is fed into the exhaust system of the engine for promoting the oxidation of unburned HC and CO components in the exhaust gas. As an exhaust gas purifying system of this type, there has been proposed an exhaust gas purifying system in which a reed valve is disposed in a secondary air feed conduit communicating the inside of the air cleaner with the exhaust system of the engine, and secondary air is automatically sucked into the exhaust system from the inside of the air cleaner via the reed valve when a vacuum is produced in the exhaust system due to the pressure pulsation of the exhaust gas. In such an exhaust gas purifying system, the secondary air feed conduit is usually arranged so as to open into the dust portion in the air cleaner and, in addition, an air cleaner element for secondary air is disposed on the opening of the secondary air feed conduit. However, in this construction, when the reed valve is destroyed, the exhaust gas having a high temperature flows backwards into the air cleaner and, then, into the cylinder of the engine. This results in bringing about an unsatisfactory operation of the engine and causing a great amount damage to the intake system of the engine.

An object of the present invention is to provide an air cleaner capable of preventing a large part of the exhaust gas from flowing backward into the inside of the air cleaner when the reed valve is destroyed.

According to the present invention, there is provided an air cleaner of an internal combustion engine having an intake passage, an exhaust passage and a reed valve disposed in a secondary air feed conduit communicating said air cleaner with said exhaust passage, said air cleaner comprising: a casing having a circumferential wall; an air filter element disposed in said casing and defining a clean portion in an inside of said air filter element and a dust portion between said air filter element and said circumferential wall, said clean portion being connected to said intake passage; elongated partition means arranged along said circumferential wall for defining a secondary air passage between said partition means and said circumferential wall, said secondary air passage having a first end and a second end opening into the atmosphere, said second end being located at a position remote from said first end; a secondary air inlet disposed in said first end of the secondary air passage and connected to said secondary air feed conduit; a secondary air filter element disposed in said secondary air passage at a position near said secondary air inlet; and, hole means for communicating said dust portion with said secondary air passage.

The present invention may be more fully understood from the description of preferred embodiments of the invention set forth below, together with the accompanying drawings.

DESCRIPTION OF PREFERRED EMBODIMENTS

Figure 1:
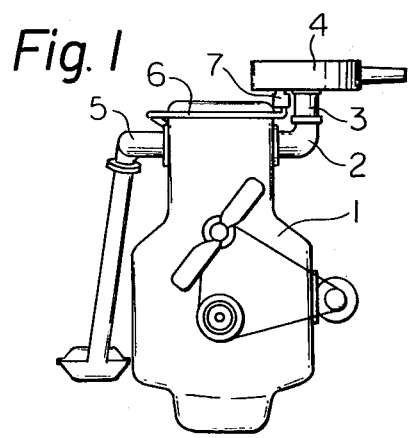
FIG. 1 is a general view of an internal combustion engine.

Referring to FIG. 1, 1 designates an engine body, 2 an intake manifold, 3 a carburetor and 4 an air cleaner; 5 an exhaust manifold, 6 a secondary air feed conduit communicating the inside of the air cleaner 4 and the exhaust port (not shown) of the cylinder head of the engine, and 7 a reed valve disposed in the secondary air feed conduit 6. Secondary air is fed into the exhaust port from the air cleaner via the reed valve 7 and the secondary air feed conduit 6 when a vacuum is produced in the exhaust port due to the pressure pulsation of the exhaust gas.

Figure 2:
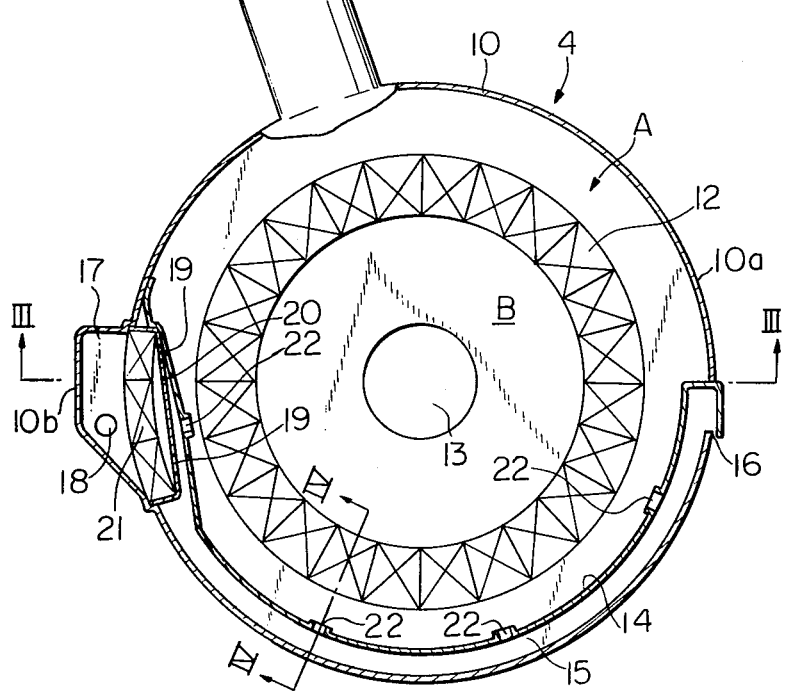
FIG. 2 is a cross-sectional plan view of an embodiment of an air cleaner according to the present invention.
Figure 3:
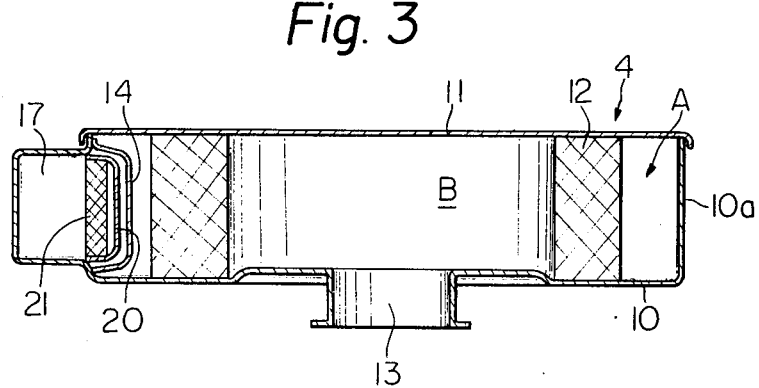
FIG. 3 is a cross-sectional view taken along the line III—III in FIG. 2.
Figure 4:
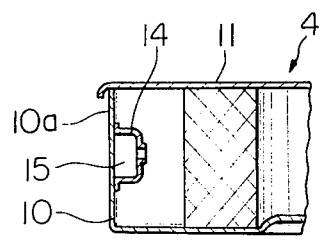
FIG. 4 is a cross-sectional view taken along the line IV—IV in FIG. 2.

FIGS. 2 through 4 show an air cleaner according to the present invention. Referring to FIGS. 2 through 4, the air cleaner 4 comprises a stationary casing 10 and a lid 11 removably mounted on the casing 10. An air cleaner element 12 is disposed in the casing 10. The air introduced into a dust portion A of the air cleaner 4 from an air inlet 9 is sucked into a clean portion B of the air cleaner 4 via the air cleaner element 12 and, then, fed into the carburetor 3 via an opening 13. A channel member 14 is welded onto the inner wall of a circumferential wall 10a of the casing 10, and a secondary air passage 15 having a rectangular cross-section as shown in FIG. 4 is formed between the channel member 14 and the circumferential wall 10a of the casing 10. As is shown in FIG. 2, this secondary air passage 15 is arranged to extend along approximately half of the circumferential wall 10a. In addition, one end of the secondary air passage 15 opens into the atmosphere outside of the casing 10 via an opening 16. A part 10b of the circumferential wall 10a is formed so as to outwardly project, and a chamber 17 is formed in the part 10b of the circumferential wall 10a. A secondary air inlet 18 is formed in the chamber 17 and is connected to the secondary air feed conduit 6 (FIG. 1). In addition, an air cleaner element 21 for secondary air is disposed in the chamber 17 and is supported by a support plate 20 having a plurality of openings 19 thereon. As is shown in FIG. 3, the channel member 14 is so formed that the cross-sectional area of the channel member 14 is enlarged at a position near the air cleaner element 21. As is shown in FIG. 2, four holes 22 communicating the dust portion A of the air cleaner 4 with the secondary air passage 15 are equiangularly arranged on the channel member 14 along the circumferential direction of the air cleaner 4.

Secondary air is mainly introduced into the secondary air passage 15 via the holes 22 and, then, the secondary air is fed into the exhaust port of the engine via the openings 19 of the support plate 20, the air cleaner element 21, the secondary air inlet 18, the secondary air feed conduit 6, and the reed valve 7. In the air cleaner 4 having the above-mentioned construction, even if the reed valve 7 is destroyed and remains open and, as a result, the exhaust gas flows backwards into the secondary air passage 15 via the air cleaner element 21, the exhaust gas flows in the secondary air passage 15 along the circumferential wall 10a due to the inertia of the exhaust gas and, thus, a large part of the exhaust gas is discharged into the atmosphere via the opening 16. Consequently, a large part of the exhaust gas does not flow backwards into the dust portion A of the air cleaner 4.

Figure 5:
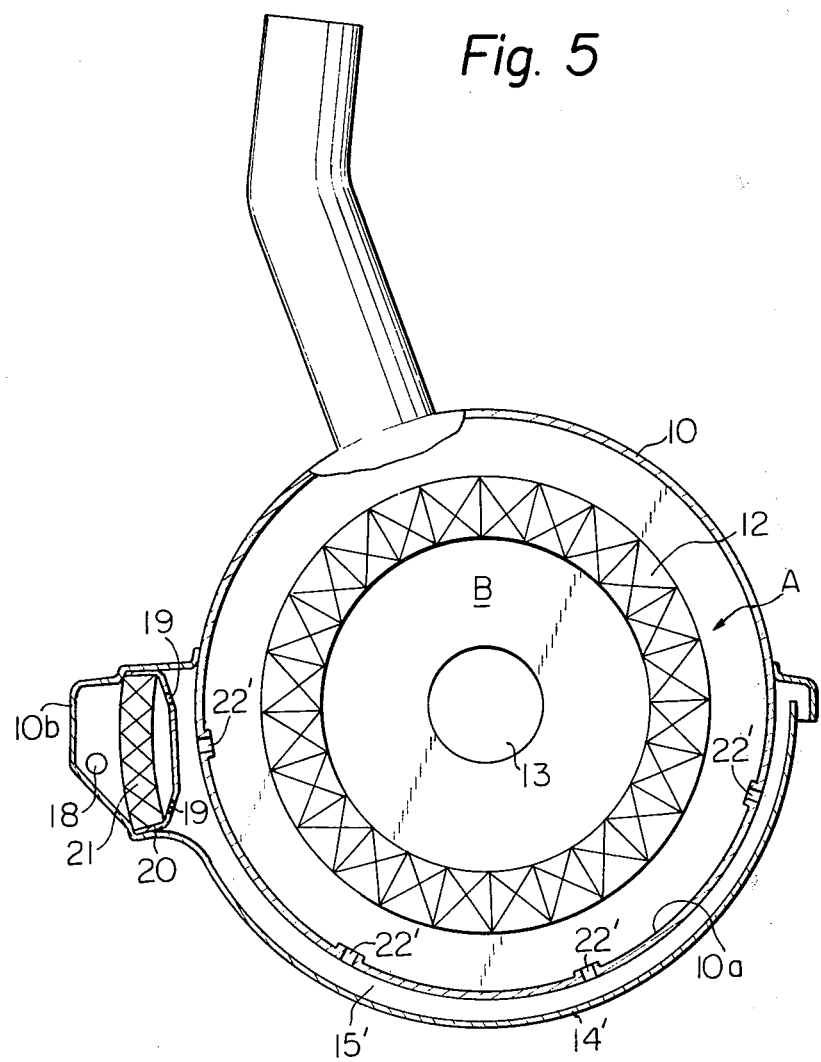
FIG. 5 is a cross-sectional plan view of another embodiment according to the present invention.

FIG. 5 shows another embodiment according to the present invention. In this embodiment, a channel member 14' is welded onto the outer surface of the circumferential wall 10a of the casing 10, and a secondary air passage 15' is formed between the channel member 14' and the circumferential wall 10a. In addition, four holes 22' communicating the dust portion A of the air cleaner 4 with the secondary air passage 15' are equiangularly arranged on the circumferential wall 10a of the casing 10 along the circumferential direction of the air cleaner 4.

In an exhaust gas purifying device of the above-mentioned type in which secondary air is sucked into the exhaust system of the engine via the reed valve when a vacuum is produced in the exhaust port due to the pressure pulsation of the exhaust gas, there is a particular problem in that suction noise occurs. However, in the air cleaner 4 according to the present invention, by providing the chamber 17, the elongated secondary air passage 15 and the holes 22, pulsating sound pressure generated in the reed valve 7 interferes and attenuates and, as a result, highly effective silencing of the suction noise can be obtained. In addition, by providing the holes 22, it is possible to attenuate the pulsating pressure wave generated in the casing 10 of the air cleaner 4 and cause fluctuation of the air-fuel ratio of the mixture formed in the carburetor.

Figure 6:
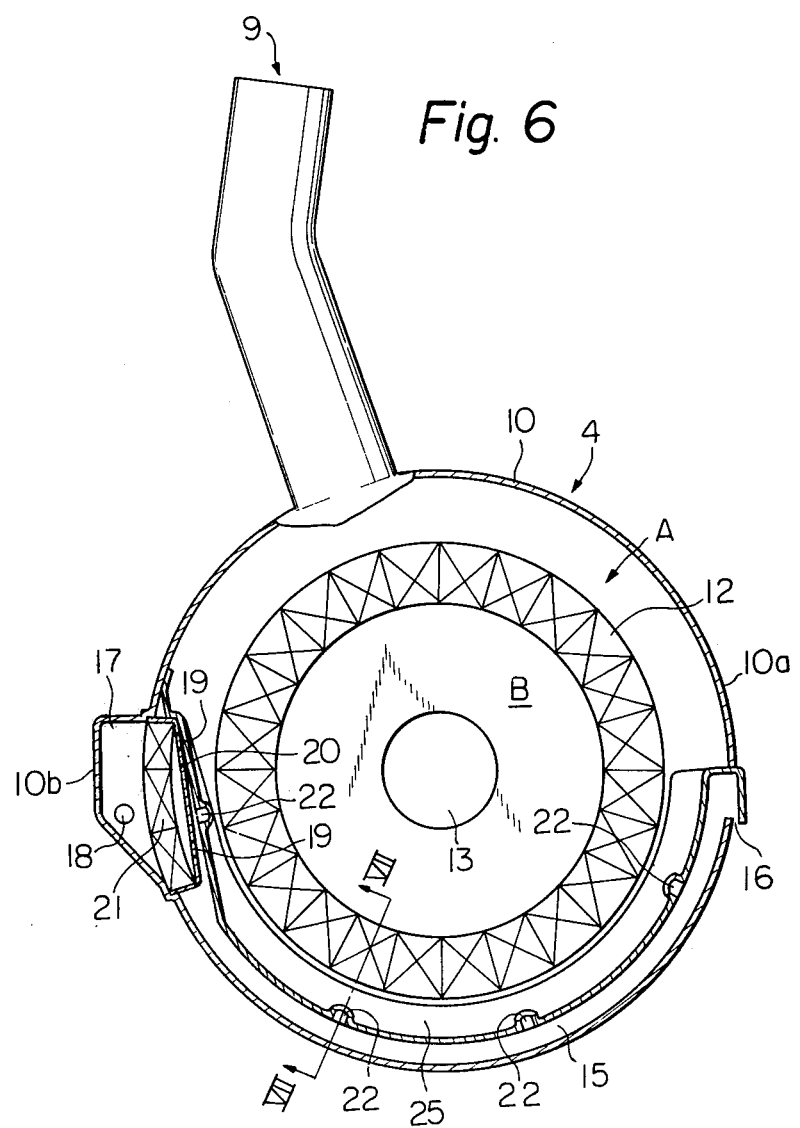
FIG. 6 is a cross-sectional plan view of a further embodiment according to the present invention.
Figure 7:
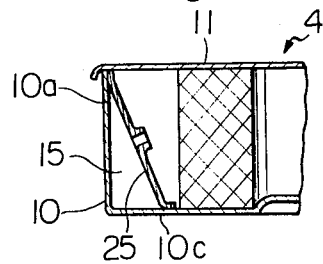
FIG. 7 is a cross-sectional view taken along the line VII—VII in FIG. 6.
Figure 8:
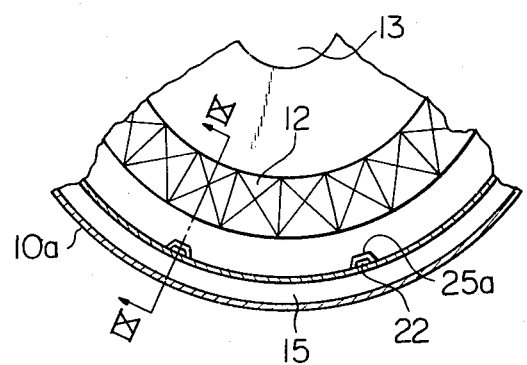
FIG. 8 is a cross-sectional plan view of a still further embodiment according to the present invention.
Figure 9:
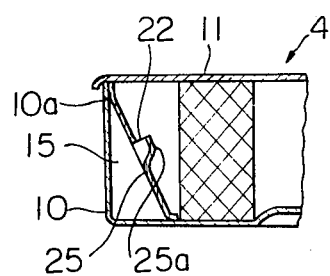
FIG. 9 is a cross-sectional view taken along the line IX—IX in FIG. 8.

FIGS. 6 and 7 show a further embodiment according to the present invention. Referring to FIGS. 6 and 7, a partition 25 is arranged along the circumferential wall 10a of the casing 10. The upper end of the partition 25 is welded onto the inner surface of the circumferential wall 10a, while the lower end of the partition 25 is welded onto the bottom wall 10c of the casing 10. Consequently, in this embodiment, a secondary air passage 15 having a triangular cross-section is formed by the partition 25, and holes 22 are formed on the partition 25. In the embodiments shown in FIGS. 1 through 7, the holes 22 are so formed that the openings of the holes 22 are directed to the outer periphery of the air cleaner element 12. Consequently, in these embodiments, when the reed valve 7 is destroyed and, as a result, the exhaust gas flows backwards into the secondary air passage 15, the exhaust gas injected from the holes 22 and having a high temperature directly impinges upon the outer periphery of the air cleaner element 12. As a result there is a danger that a part of the air cleaner element 12 will be scorched. In order to avoid this danger, as is shown in FIGS. 8 and 9, it is preferable that a part of the partition 25 be formed so as to inwardly project, thereby forming the holes 22 opening upwards into the dust portion A.

Figure 10:
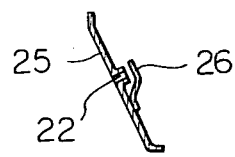
FIG. 10 is a cross-sectional view of an embodiment of a partition.

Instead of projecting a part of the partition 25, as is shown in FIG. 10, baffle plates 26 covering the holes 22 may be welded onto the partition 25. In the embodiments shown in FIGS. 8 through 10, the exhaust gas flowing backwards into the secondary air passage 15 is injected into the dust portion A from the holes 22 towards the lid 11 and, as a result, the air cleaner element 12 is not scorched.

According to the present invention, even if the reed valve is destroyed, a large part of the exhaust gas flowing backwards into the secondary air passage is discharged into the atmosphere. As a result of this, a stable combustion can be obtained and a danger in that the carburetor is damaged by the exhaust gas can be avoided. In addition, an extremely high effectiveness of silencing the suction noise can be obtained.

While the invention has been described by reference to specific embodiments chosen for purposes of illustration, it should be apparent that numerous modifications could be made thereto by those skilled in the art without departing from the spirit and scope of the invention.

What is claimed is:

1. An air cleaner of an internal combustion engine having an intake passage, an exhaust passage and a reed valve disposed in a secondary air feed conduit communicating said air cleaner with said exhaust passage, said air cleaner comprising:
   a casing having a circumferential wall;
   an air filter element disposed in said casing and defining a clean portion in an inside of said air filter element and a dust portion between said air filter element and said circumferential wall, said clean portion being connected to said intake passage;
   elongated partition means arranged along said circumferential wall for defining a secondary air passage between said partition means and said circumferential wall, said secondary air passage having a first end and a second end opening into the atmosphere, said second end being located at a position remote from said first end;
   a secondary air inlet disposed in said first end of the secondary air passage and connected to said secondary air feed conduit;
   a secondary air filter element disposed in said secondary air passage at a position near said secondary air inlet, and;
   hole means for communicating said dust portion with said secondary air passage.

2. An air cleaner as claimed in claim 1, wherein said partition means extends along approximately half of said circumferential wall.

3. An air cleaner as claimed in claim 2, wherein said partition means comprises a channel member for defining said secondary air passage having a rectangular cross-section.

4. An air cleaner as claimed in claim 2, wherein said partition means comprises a plate for defining said secondary air passage having a triangular cross-section.

5. An air cleaner as claimed in claim 1, wherein a chamber is formed in said first end of the secondary air passage, said secondary air filter element being disposed in said chamber.

6. An air cleaner as claimed in claim 5, wherein said secondary air filter element is supported by a support plate having a plurality of openings.

7. An air cleaner as claimed in claim 1, wherein said hole means comprises a plurality of holes equiangularly arranged along said circumferential wall.

8. An air cleaner as claimed in claim 7, wherein said holes open upward into said dust portion.

9. An air cleaner as claimed in claim 8, wherein portions of said partition wall are inwardly projected, said holes being formed on the upper ends of said projecting portions.

10. An air cleaner as claimed in claim 8, wherein baffle plates are fixed onto said partition means and arranged to cover said holes.

* * * * *

UNITED STATES PATENT AND TRADEMARK OFFICE
CERTIFICATE OF CORRECTION

PATENT NO. : 4,134,263
DATED : January 16, 1979
INVENTOR(S) : Noboru MATSUMOTO et al It is certified that error appears in the above-identified patent and that said Letters Patent are hereby corrected as shown below:

On sheets 1, 2, 3, 4 and 5 of the drawings please correct the Patent number by changing "4,334,263" to --4,134,263--.

Signed and Sealed this

Eighth Day of May 1979

[SEAL]

Attest:

RUTH C. MASON
*Attesting Officer*

DONALD W. BANNER
*Commissioner of Patents and Trademarks*